(12) United States Patent
Spiro

(10) Patent No.: US 10,907,805 B2
(45) Date of Patent: *Feb. 2, 2021

(54) SURFACE MOUNTED LIGHT FIXTURE AND HEAT DISSIPATING STRUCTURE FOR SAME

(71) Applicant: Daniel S. Spiro, Scottsdale, AZ (US)

(72) Inventor: Daniel S. Spiro, Scottsdale, AZ (US)

(73) Assignee: LIGHTING DEFENSE GROUP, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/667,682

(22) Filed: Oct. 29, 2019

(65) Prior Publication Data

US 2020/0063947 A1 Feb. 27, 2020

Related U.S. Application Data

(63) Continuation of application No. 16/283,813, filed on Feb. 24, 2019, now Pat. No. 10,495,289, which is a
(Continued)

(51) Int. Cl.
*F21V 21/02* (2006.01)
*F21V 29/70* (2015.01)
(Continued)

(52) U.S. Cl.
CPC ............ *F21V 21/02* (2013.01); *F16L 3/06* (2013.01); *F21S 2/005* (2013.01); *F21S 8/026* (2013.01); *F21S 8/04* (2013.01); *F21V 5/02* (2013.01); *F21V 5/04* (2013.01); *F21V 23/002* (2013.01); *F21V 23/008* (2013.01); *F21V 23/023* (2013.01); *F21V 23/06* (2013.01); *F21V 29/70* (2015.01); *F21V 29/74* (2015.01); *F21V 29/75* (2015.01); *F21V 29/773* (2015.01); *F21V 31/005* (2013.01); *H02G 3/03* (2013.01); *H02G 3/0437* (2013.01); *F21V 23/0464* (2013.01);
(Continued)

(58) Field of Classification Search
CPC combination set(s) only.
See application file for complete search history.

(56) References Cited

U.S. PATENT DOCUMENTS

D190,827 S 7/1961 Phillips
D192,608 S 4/1962 Cooke
(Continued)

*Primary Examiner* — Diane I Lee
*Assistant Examiner* — Zachary J Snyder
(74) *Attorney, Agent, or Firm* — Barnes & Thornburg LLP

(57) ABSTRACT

A light fixture includes a heat dissipating structure, an electronics assembly, and a bolt for attaching the heat dissipating structure to an external panel. The heat dissipating structure includes a first side having multiple outwardly extending projection regions and a socket, for receiving a light source, is formed in an apex of each projection region. A second side of the heat dissipating structure includes a heat sink formed in an internal cavity of each projection region. The heat sink includes fins in contact with and radially arranged about an outer surface of the socket. The electronics assembly is located at the first side of the heat dissipating structure. The bolt includes a passage through which wiring from an external source is routed to the electronics assembly. The electronics assembly includes wires routed through channels in each of the projection regions that electrically interconnect the light sources to the electronics assembly.

18 Claims, 9 Drawing Sheets

Related U.S. Application Data continuation of application No. 15/782,665, filed on Oct. 12, 2017, now Pat. No. 10,415,803, which is a continuation of application No. 14/486,531, filed on Sep. 15, 2014, now Pat. No. 9,816,693, which is a continuation of application No. 13/161,283, filed on Jun. 15, 2011, now Pat. No. 8,944,637, which is a continuation-in-part of application No. 29/390,547, filed on Apr. 26, 2011, now Pat. No. Des. 653,792.

(51) Int. Cl.
| | | |
|---|---|---|
| *F21V 29/74* | (2015.01) | |
| *F21V 29/75* | (2015.01) | |
| *F21V 29/77* | (2015.01) | |
| *F21S 2/00* | (2016.01) | |
| *F21S 8/02* | (2006.01) | |
| *F21S 8/04* | (2006.01) | |
| *F21V 5/02* | (2006.01) | |
| *F21V 5/04* | (2006.01) | |
| *F21V 23/00* | (2015.01) | |
| *F21V 23/02* | (2006.01) | |
| *F21V 31/00* | (2006.01) | |
| *F16L 3/06* | (2006.01) | |
| *F21V 23/06* | (2006.01) | |
| *H02G 3/03* | (2006.01) | |
| *H02G 3/04* | (2006.01) | |
| *F21Y 105/10* | (2016.01) | |
| *F21Y 115/10* | (2016.01) | |
| *F21V 23/04* | (2006.01) | |
| *F21W 131/305* | (2006.01) | |

(52) U.S. Cl.
CPC .... *F21V 23/0471* (2013.01); *F21W 2131/305* (2013.01); *F21Y 2105/10* (2016.08); *F21Y 2115/10* (2016.08); *Y10T 29/49117* (2015.01)

(56) References Cited

U.S. PATENT DOCUMENTS

| | | |
|---|---|---|
| D208,461 S | 9/1967 | Morgan |
| D209,721 S | 9/1967 | Stanley |
| D214,939 S | 8/1969 | Arrigoni |
| D215,341 S | 9/1969 | Mulvey et al. |
| D221,351 S | 8/1971 | Remington |
| D232,376 S | 8/1974 | Yahraus et al. |
| D300,877 S | 4/1989 | Cyr |
| D362,081 S | 9/1995 | Bilbrey |
| D411,031 S | 6/1999 | Conn et al. |
| D473,667 S | 4/2003 | Fromm |
| 6,952,079 B2 | 10/2005 | Shiang et al. |
| D514,732 S | 2/2006 | Benensohn |
| D581,090 S | 11/2008 | Colleran, Jr. et al. |
| 7,506,994 B1 | 3/2009 | Waycaster et al. |
| 7,631,990 B2 | 12/2009 | Neeld et al. |
| 7,687,216 B2 | 3/2010 | Kataoka et al. |
| 7,744,254 B2 | 6/2010 | Spiro |
| 7,766,497 B2 | 8/2010 | Sommers et al. |
| D623,795 S | 9/2010 | Ngai et al. |
| 7,806,563 B1 | 10/2010 | Bruck et al. |
| 7,866,850 B2 | 1/2011 | Alexander et al. |
| 7,878,683 B2 | 2/2011 | Logan et al. |
| 7,887,216 B2 | 2/2011 | Patrick |
| 7,891,838 B2 | 2/2011 | Scott |
| D634,056 S | 3/2011 | Hokazono et al. |
| 7,938,567 B2 | 5/2011 | Faber et al. |
| 7,939,837 B2 | 5/2011 | Lynch et al. |
| D645,196 S | 9/2011 | Hickock |
| D653,792 S | 2/2012 | Spiro |
| 8,125,776 B2 | 2/2012 | Alexander et al. |
| 8,529,100 B1 | 9/2013 | Patrick et al. |
| 8,944,637 B2 | 2/2015 | Spiro |
| 9,816,693 B2 | 11/2017 | Spiro |
| 2006/0221621 A1 | 10/2006 | Ruben |
| 2007/0139913 A1 | 6/2007 | Savage |
| 2008/0246383 A1 | 10/2008 | Chang |
| 2009/0034283 A1 | 2/2009 | Albright et al. |
| 2009/0109670 A1 | 4/2009 | Boyer |
| 2011/0103043 A1 | 5/2011 | Ago et al. |
| 2012/0057351 A1 | 3/2012 | Wilcox |
| 2012/0305230 A1 | 12/2012 | Breen, IV et al. |

US 10,907,805 B2

SURFACE MOUNTED LIGHT FIXTURE AND HEAT DISSIPATING STRUCTURE FOR SAME

CROSS REFERENCE TO RELATED APPLICATIONS

This application is a continuation of the earlier U.S. Utility patent application Ser. No. 16/283,813, filed Feb. 242019, which is a continuation of the U.S. Utility patent application Ser. No. 15/782,665, filed Oct. 12, 2017, which is a continuation of the earlier U.S. Utility patent application Ser. No. 14/486,531, filed Sep. 15, 2014, now U.S. Pat. No. 9,816,693, which is a continuation of the earlier U.S. Utility patent application Ser. No. 13/161,283, filed Jun. 15, 2011, now U.S. Pat. No. 8,944,637, which is a continuation-in-part of the earlier U.S. patent application Ser. No. 29/390,547, filed Sep. 15, 2014, now Pat. No. D653792, the disclosures of which are hereby incorporated entirely herein by reference.

TECHNICAL FIELD OF THE INVENTION

The present invention relates generally to light fixtures. More specifically, the present invention relates to a light fixture for a light emitting diode (LED) light source having effective heat dissipation capability.

BACKGROUND OF THE INVENTION

Solid state lighting, such as light-emitting diodes (LEDs), offers a viable alternative to traditional light sources such as fluorescent, high intensity discharge (HID), and incandescent lamps. Indeed, light fixtures (technically referred to as luminaires in accordance with International Electrotechnical Commission terminology) employing LEDs are fast emerging as a superior alternative to conventional light fixtures because of their high energy conversion and optical efficiency, robustness, lower operating costs, and so forth.

However, a significant concern in the design and operation of LED-based light fixtures is that of thermal management. Implementation of LEDs for many light fixture applications has been hindered by the amount of heat build-up within the electronic circuits of the LEDs. This, heat build-up reduces LED light output, shortens lifespan, and can eventually cause the LEDs to fail. Consequently, effective heat dissipation is an important design consideration for maintaining light output and/or increasing lifespan for the light source.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION

Embodiments of the invention entail a surface mounted light fixture and a heat dissipating structure for the light fixture. The light fixture and heat dissipating structure are configured to accommodate multiple LED light sources. Light emitting diode (LED) lamps, i.e., LED light sources, are particularly suitable for applications calling for low-profile light fixtures due to their compact size. Additionally, the low energy consumption, long operating life, and durability of LED light sources make them advantageous in commercial applications in which a significant number of light fixtures are required to appropriately illuminate a relatively large area.

The surface mounted configuration of the light fixture is especially suitable in, for example, commercial environments, where its low profile decreases the possibility of damage by operational traffic within the commercial space. The heat dissipating structure includes sockets each of which is configured to receive one of the multiple LED light sources. The heat dissipating structure maintains low temperature at the sockets, i.e., the junction between the LED light source and the structure, by effectively conducting heat generated by the LED light source away from the LED light source. Maintaining a low temperature at this junction yields improvements in lamp energy efficiency and enhanced lifespan for the LED light sources. Additionally, the configuration of the heat dissipating structure provides a rigid and moisture resistant design suitable in adverse environments.

Figure 1:
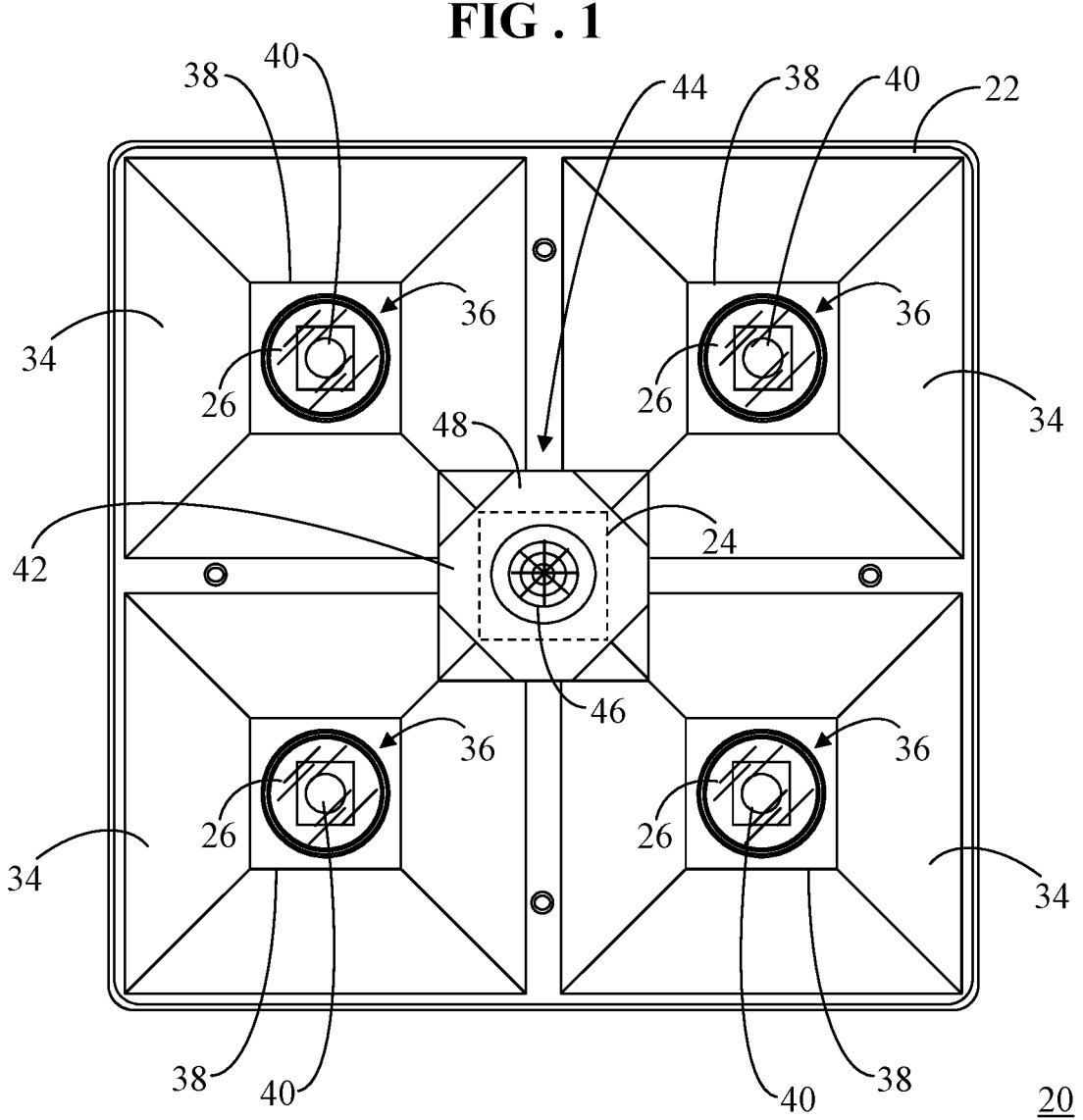
FIG. 1 shows a top view of a surface mounted light fixture in accordance with an embodiment.
Figure 2:
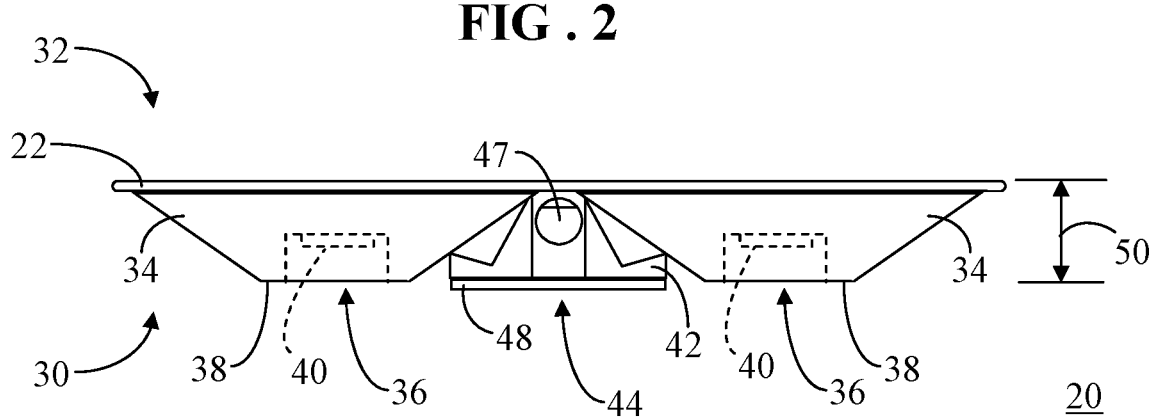
FIG. 2 shows a side view of the surface mounted light fixture.

Referring to FIGS. 1 and 2, FIG. 1 shows a top view of a surface mounted light fixture 20 in accordance with an embodiment, and FIG. 2 shows a side view of surface mounted light fixture 20. Surface mounted light fixture 20 generally includes a heat dissipating structure 22, an electronics assembly 24 (shown in ghost form in FIG. 1), and lens assemblies 26. Light fixture 20 further includes a bolt 28 (visible in FIG. 9) configured for attachment of heat dissipating structure 22 to an external panel (not shown), which will be discussed in further detail in connection with FIGS. 9 and 10.

Heat dissipating structure 22 includes a first side 30 and a second side 32 opposing first side 30. In an mounting configuration of light fixture 20, light fixture 20 is hung such that second side 32 resides against an external panel, ceiling surface, or the like. Thus, first side 30 faces outwardly toward the underlying volume in which light fixture 20 is installed.

First side 30 includes at least one projection region 34 extending outwardly from first side 30. A socket 36 is formed in an apex 38 of each projection region 34. Each socket 36 is configured to receive a light source 40. Light source 40 may be any suitable lamp or light array, such as an LED lamp. One each of lens assemblies 26 is coupled to first side 30 of heat dissipating structure 22 over each socket 36 containing light source 40. Lens assemblies 26 protect light sources 40 from environmental hazards, such as water damage. Additionally lens assemblies 26 function to appropriately distribute the light from each light source 40 (discussed below).

A junction box 42 is coupled to first side 28 of heat dissipating structure 22 at a central section 44 of structure 22. Thus, junction box 42 is centrally located between adjacent projection regions 34. In an embodiment, heat dissipating structure 22 and junction box 42 may be formed as a monolithic casting (i.e., formed from a single piece of material) of a heat conducting metallic or non-metallic material. In alternative embodiments, heat dissipating structure 22 and junction box 42 may be two separately manufactured components that are bolted, welded, or otherwise coupled together during manufacturing.

In its centralized location between adjacent projection regions 32, junction box 42 functions to centralize power distribution and serves as a data receiving and transmitting hub for light fixture 20. More particularly, electronics assembly 24 is housed in junction box 42, and electronics assembly 24 is configured for electrically interconnecting light sources 40 to an external power source (not shown). Junction box 42 can additionally contain sensory and communications devices such as an occupancy sensor 46, motion sensor, photocell, and the like. In some embodiments, junction box 42 can additionally include one or more openings 47 extending through its side walls. These openings 47 will be discussed in greater detail in connection with FIG. 13. A cover 48 is attached to junction box 42 to protect electronics assembly 24 and any other components from environmental hazards, such as water damage.

The configuration of heat dissipating structure 22 and the use of light sources 40 in the form of LED-based light sources yields a low profile configuration of light fixture 20 having a height 50 of, for example, less than two inches.

Figure 3:
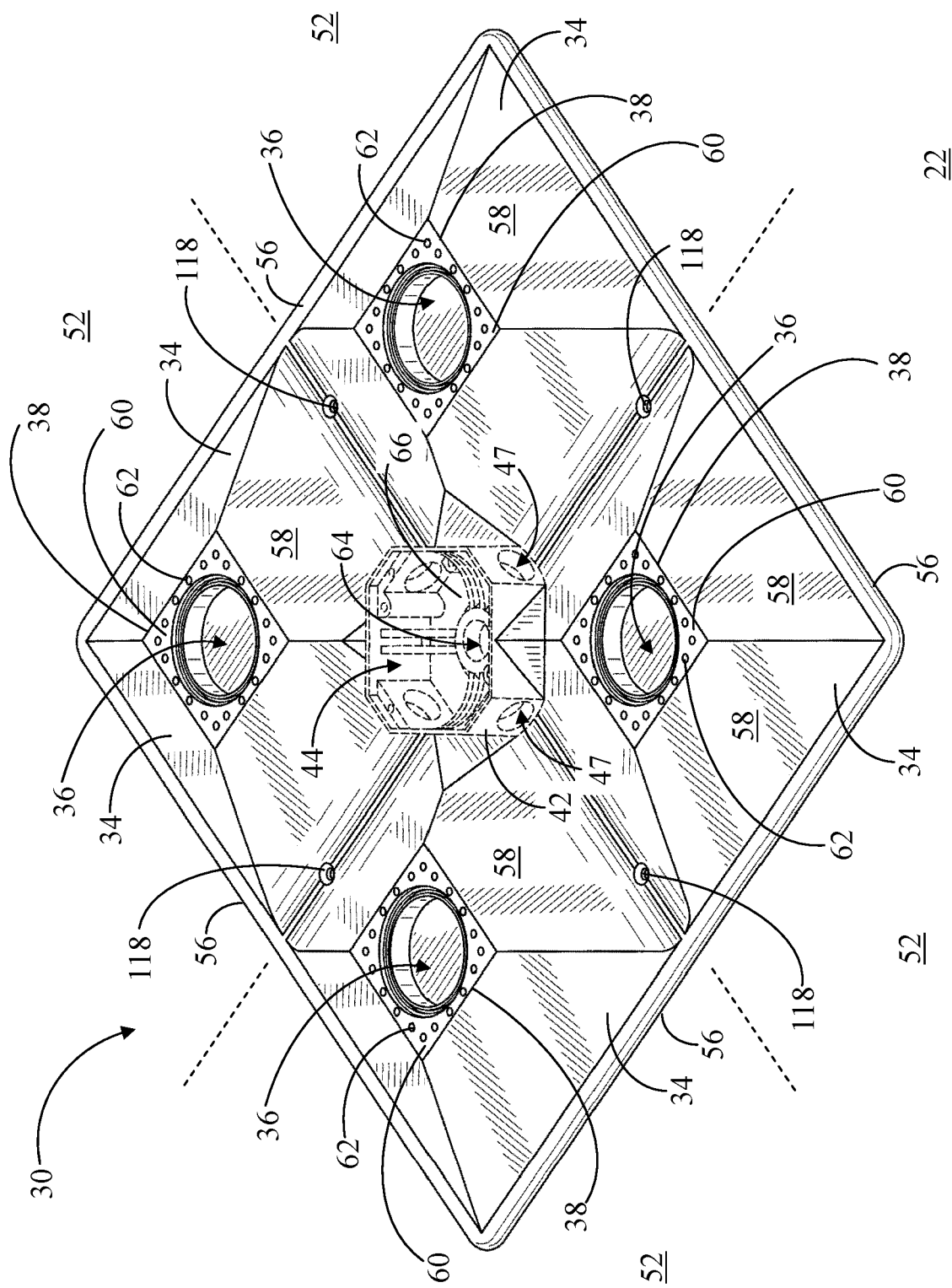
FIG. 3 shows a front perspective view of a heat dissipating structure for the surface mounted light fixture of FIG. 1.
Figure 4:
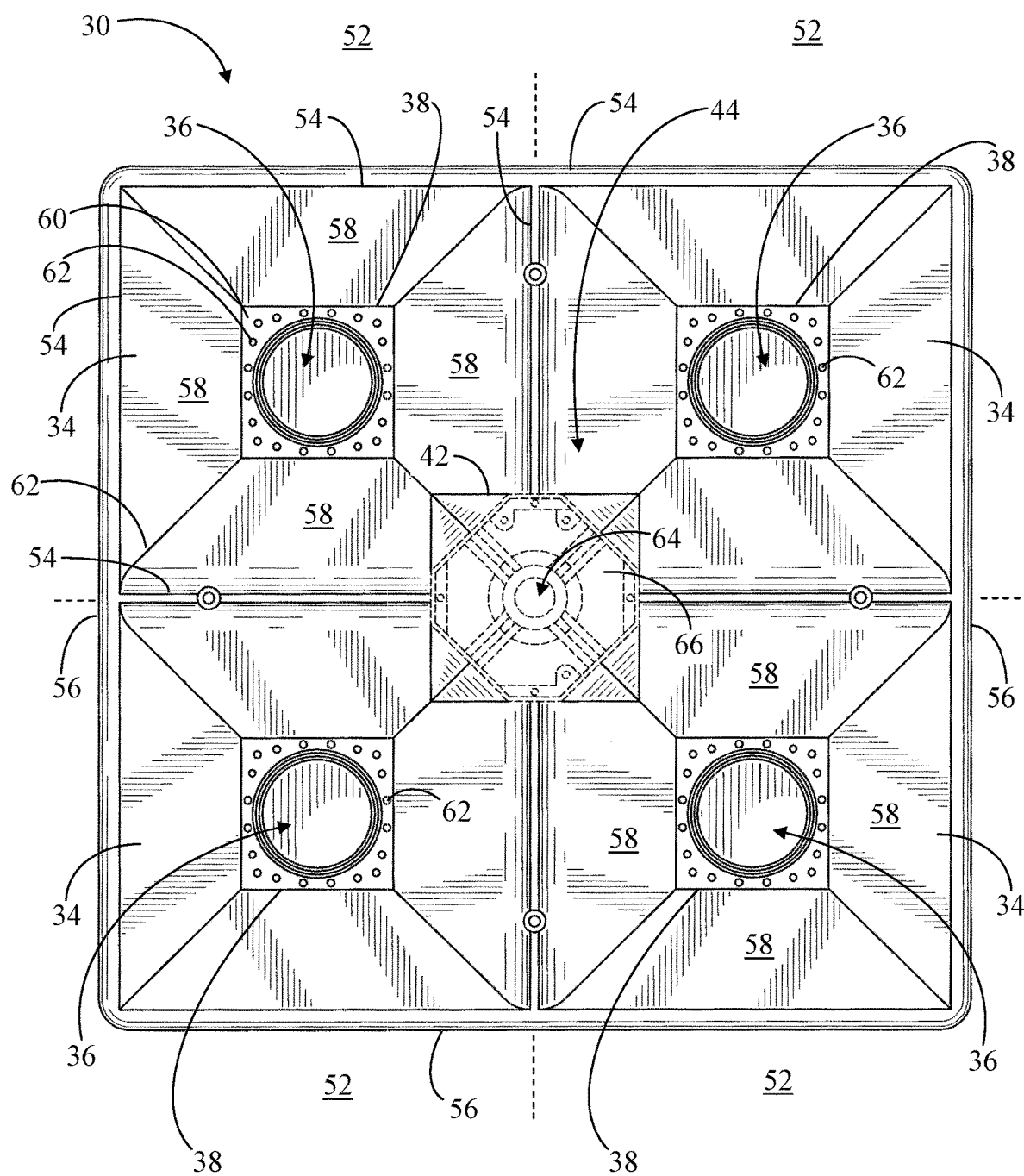
FIG. 4 shows a front view of the heat dissipating structure.

Referring now to FIGS. 3 and 4, FIG. 3 shows a front perspective view of heat dissipating structure 22 for surface mounted light fixture 20 (FIG. 1), and FIG. 4 shows a front view of heat dissipating structure 22. In the front views of FIGS. 3 and 4, first side 30 of heat dissipating structure 22 is visible. As mentioned previously, first side 30 faces outwardly toward the underlying volume in which light fixture 20 is installed.

In an embodiment, heat dissipating structure 22 is defined, or delineated, by four quadrants 52. Each of quadrants 52 meets at central section 44, and each of quadrants 52 includes one of projection regions 34. Thus, heat dissipating structure 22 includes four projection regions 34 in the illustrated embodiment. The base of each projection region 34 is surrounded by a generally rectangular, and more particularly, square, frame section 54 (most clearly distinguishable in FIG. 4. A flanged outer frame 56 delineates an outer perimeter of heat dissipating structure 22.

As shown, each of projection regions 34 is a pyramid shaped region having four generally triangular sides 58, each of sides 58 being truncated at apex 38 to accommodate one of sockets 36. In particular, apex 38 of each projection region 34 includes a substantially planar surface 60 surrounding one of sockets 36. Planar surface 60 is oriented substantially perpendicular to an outwardly extending direction of projection region 34. This outwardly extending direction corresponds to height 50 (FIG. 2) of light fixture 20 (FIG. 2). Planar surface 60 includes apertures 62 extending through heat dissipating structure 22 from second side 32 (FIG. 2) to first side 30. Apertures 62 serve as weep holes designed to allow moisture to drain from heat dissipating structure 22, as will be discussed in greater detail below.

As mentioned above, junction box 42 is coupled to first side 30 of heat dissipating structure 22 and is located at central section 44. Accordingly, each of projection regions 34 is immediately adjacent to junction box 42. Junction box 42 may be integrally formed with heat dissipating structure 22 to form as a monolithic casting, or junction box 42 may be bolted, welded, or otherwise coupled to heat dissipating structure 22. As such, junction box 42 is illustrated in FIGS. 3 and 4 using dashed lines to represent these at least two means for forming the "coupling" between junction box 42 and heat dissipating structure 22.

Junction box 42 includes a threaded opening 64 extending through a back wall 66 of junction box 42. Threaded opening 64 is adapted to receive bolt 28 (FIG. 9) for fastening heat dissipating structure 22 to an external panel and thus fasten light fixture 20 (FIG. 1) to the external panel, as will be discussed in connection with FIGS. 9 and 10.

Figure 5:
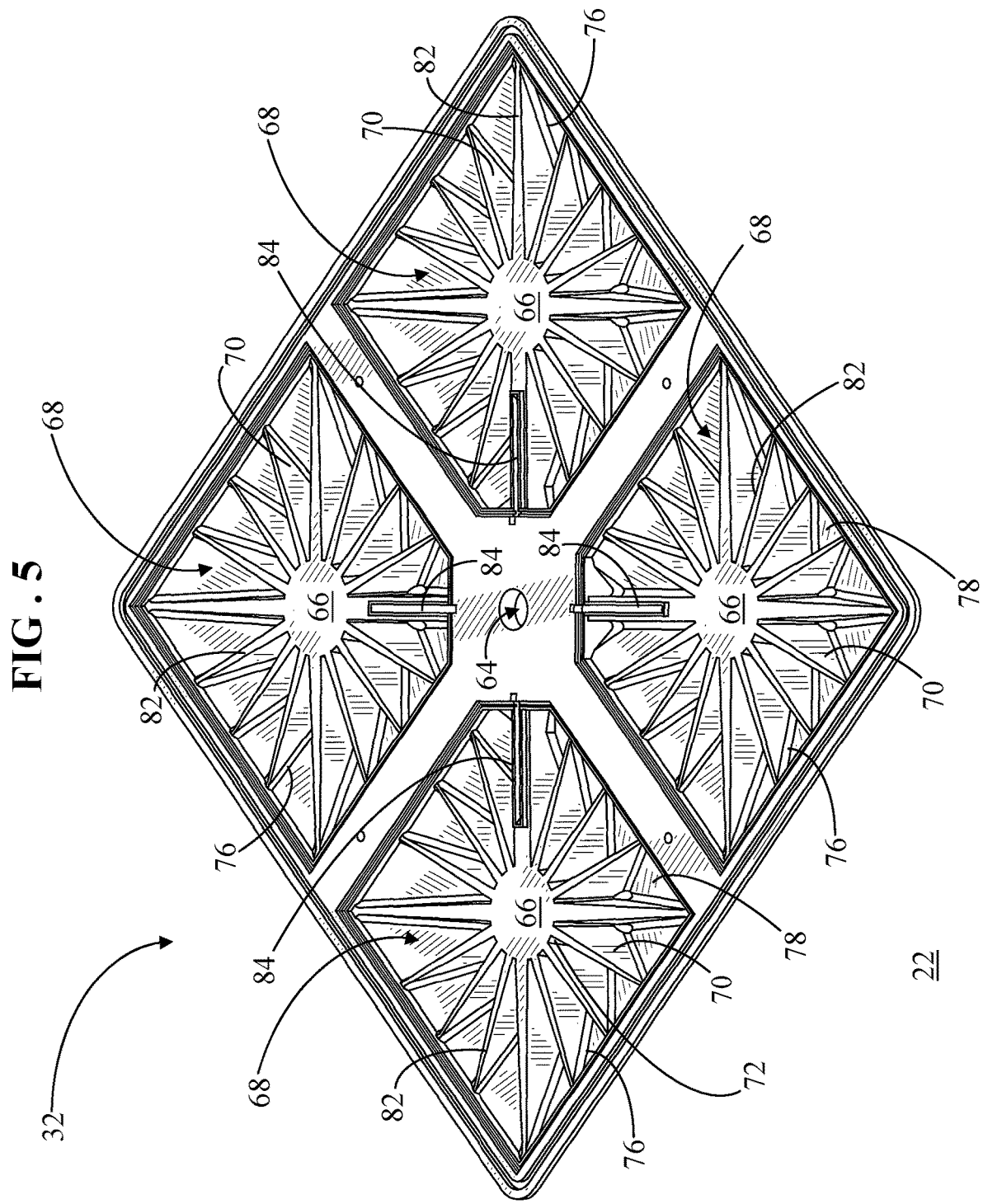
FIG. 5 shows a back perspective view of the heat dissipating structure for the surface mounted light fixture.
Figure 6:
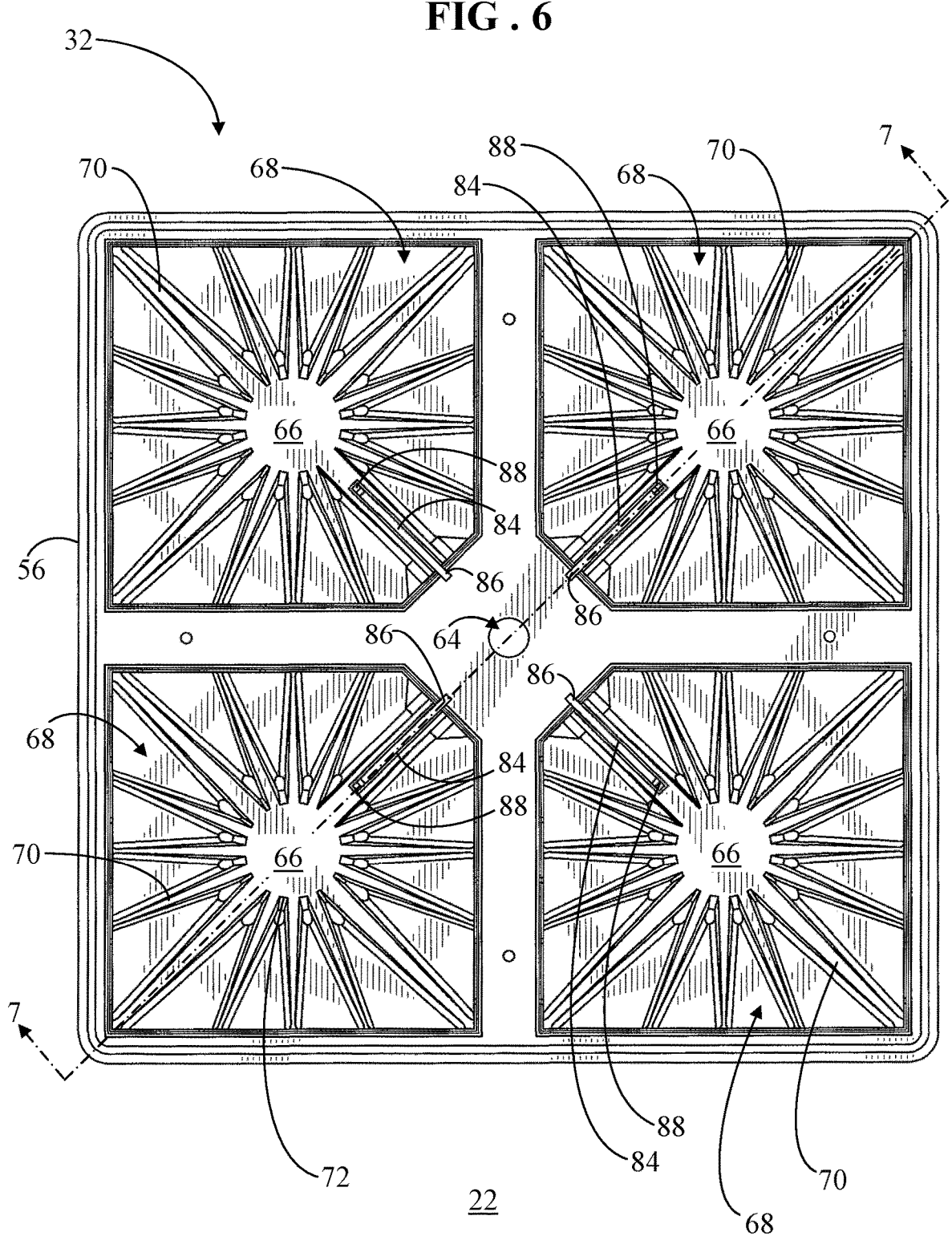
FIG. 6 shows a back view of the heat dissipating structure.
Figure 7:
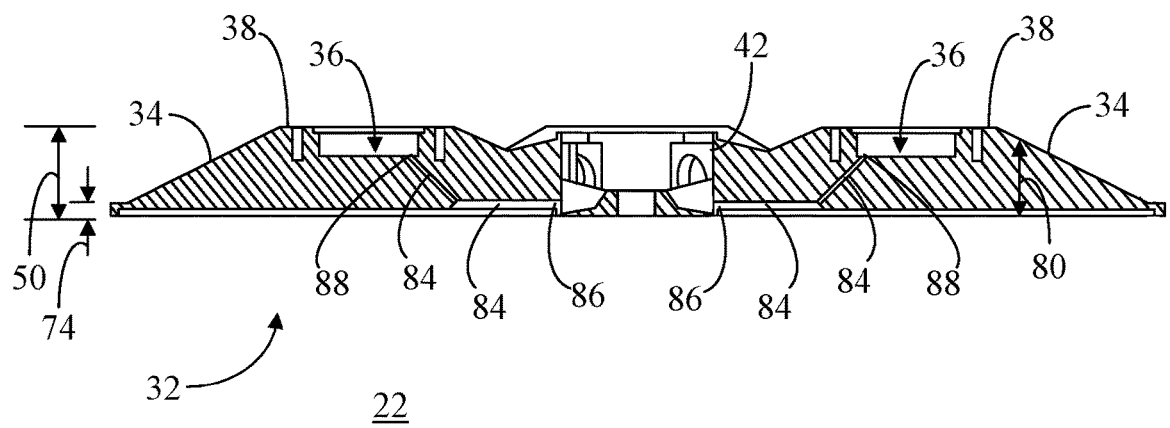
FIG. 7 shows a side sectional view of the heat dissipating structure along sections lines 7-7 of FIG. 6.

Referring now to FIGS. 5-7, FIG. 5 shows a back perspective view of heat dissipating structure 22 for surface mounted light fixture 20 (FIG. 1). FIG. 6 shows a back view of heat dissipating structure 22, and FIG. 7 shows a side sectional view of the heat dissipating structure along sections lines 7-7 of FIG. 6. In the back views of FIGS. 5 and 6, second side 32 of heat dissipating structure 22 is visible. As mentioned previously, second side 32 resides against an external panel, ceiling surface, or the like.

Second side 32 includes a heat sink 66 formed in an internal cavity 68 of each of projection regions 34. Heat sink 66 includes a plurality of fins 70 residing in internal cavity 68. Each of fins 70 is in contact with and radially arranged about an outer surface 72 of socket 36. That is, fins 70 are oriented in a starburst pattern surrounding outer surface 72 of socket 36.

As best represented in the side sectional view of FIG. 7, heat dissipating structure 22 exhibits height 50 between apex 38 and frame section 54. Due to the pyramid structure of each of projection regions 34, a height 74 immediately proximate frame section 54 is significantly less than height 50. The decreasing height from apex 38 to frame section 54 results in a correspondingly decreasing height of internal cavity 68 from apex 38 to outer frame 56.

A top edge 76 (see FIG. 5) of each of fins 70 is coupled with an inner surface 78 of projection region 34 and with outer frame 56. Consequently, each of fins 70 exhibits a variable fin height 80 corresponding to height 50 at apex 38 and decreasing to height 74 at the outer perimeter of projection region 34 delineated by frame section 54. Additionally, a bottom edge 82 (see FIG. 5) of each of fins 70 residing in internal cavity 68 is approximately flush with outer frame 56 of heat dissipating structure 22 so that fins 70 do not project outside of outer frame 56.

Heat dissipating structure 22 further includes laterally oriented channels 84 visible from second side 32. Each channel 84 has a first end 86 opening into junction box 72 and a second end 88 opening into one of sockets 36. In particular, each projection region 34 has one of channels 84 extending between junction box 42 and its corresponding socket 36. In an embodiment, each channel 84 is adapted to receive a wire (not shown) extending between electronics assembly 24 (FIG. 1) and socket 36 for electrically interconnecting light source 40 (FIG. 1) to electronics assembly 24. In an embodiment, during assembly of light fixture 20

(FIG. 1), wires (not shown) may be routed from junction box 42 to each of sockets 36 via channels 84. After the wires are residing in channels 84, channels 84 may be sealed using an industrial sealant or encapsulating compound, so that moisture cannot enter channels 84.

Figure 8:
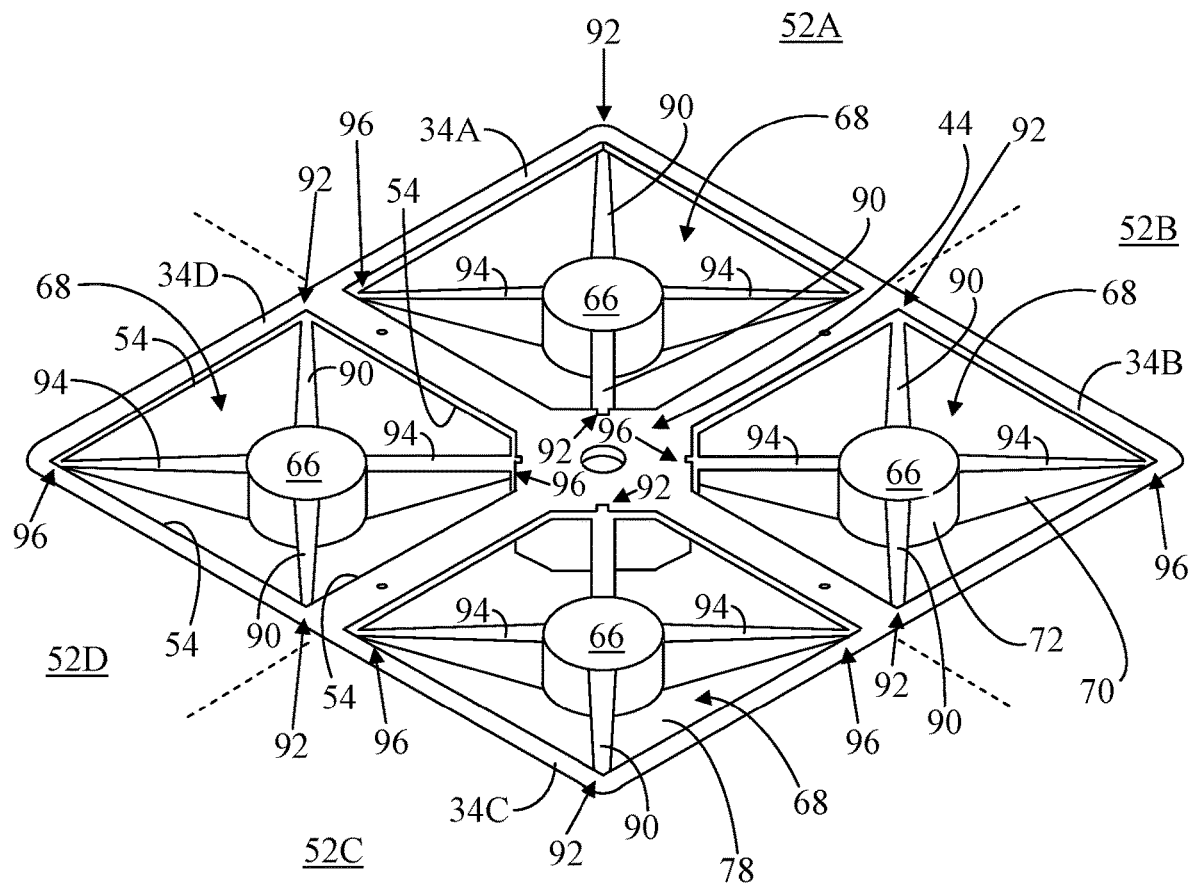
FIG. 8 shows a back perspective view of the heat dissipating structure emphasizing an X-brace configuration of the heat dissipating structure.

FIG. 8 shows a back perspective view of the heat dissipating structure 22 emphasizing an X-brace configuration of heat dissipating structure 22. In particular, a number of fins 70 are not illustrated so that primary fins 70 that provide enhanced rigidity to heat dissipating structure 22 can be clearly visualized.

It will be recalled that a generally rectangular frame section 54 surrounds a base of each projection region 34, such that frame section 54 delineates an outer perimeter of internal cavity 68. For each of projection regions 34, a first pair 90 of fins 70 extends from outer surface 72 of socket 36 to a first pair of diagonally opposed corners 92 of frame section 54. Additionally, a second pair 94 of fins 70 extends from outer surface 72 of socket 36 to a second pair of diagonally opposed corners 96 of frame section 54. Thus, each of first and second pairs 90 and 94, respectively, of fins 70 yields an X-brace configuration within each of projection regions 34 to impart structural rigidity in each quadrant 52 of heat dissipating structure 22.

For purposes of explanation, each of quadrants 52 are successively labeled 52A, 52B, 52C, and 52D in FIG. 8. Thus, quadrant 52A is referred to herein as a first quadrant 52A, quadrant 52B is referred to herein as a second quadrant 52B, quadrant 52C is referred to herein as a third quadrant 52C, and quadrant 52D is referred to herein as a fourth quadrant 52B. First and third quadrants 52A and 52C are arranged in diagonally opposing relation relative to central section 44. In addition, second and fourth quadrants 52B and 52D are arranged in diagonally opposing relation relative to central section 44. Each of projection regions 34 are successively labeled 34A, 34B, 34C, and 34D in FIG. 8. Hence, projection region 34A is referred to herein as a first projection region 34A, projection region 34B is referred to herein as a second projection region 34B, projection region 34C is referred to herein as a third projection region 34C, and projection region 34D is referred to herein as a fourth projection region 34D.

In an embodiment, first pair 90 of fins 70 residing in internal cavity 68 of first projection region 34A located in first quadrant 52A is serially aligned with first pair 90 of fins 70 residing in internal cavity 68 of third projection region 34C located in third quadrant 52C. Similarly, second pair 94 of fins 70 residing in internal cavity 68 of second projection region 34B located in second quadrant 52B is serially aligned with second pair 94 of fins 70 residing in internal cavity 68 of fourth projection region 34D located in fourth quadrant 52D. The term "serially aligned" refers to an arrangement of fins 70 in a straight line or row. Accordingly, first pair 90 of fins 70 in each of first and third projection regions 34A and 34C are in a straight line or row, and second pair 94 of fins 70 in each of second and fourth projection regions 34B and 34D are in a straight line or row. This configuration of fins 850 extends the X-brace configuration diagonally across the entirety of heat dissipating structure 22 in order to further enhance the structural rigidity of heat dissipating structure 22. Fins 70 are illustrated as being relatively thin at the junction between central section 44 and fins 70 for simplicity of illustration. However, in practice, fins 70 may be thickened at the junction between central section 44 and fins 70 in order to withstand the stress applied by bolt 28 (FIG. 9) following installation.

Figure 9:
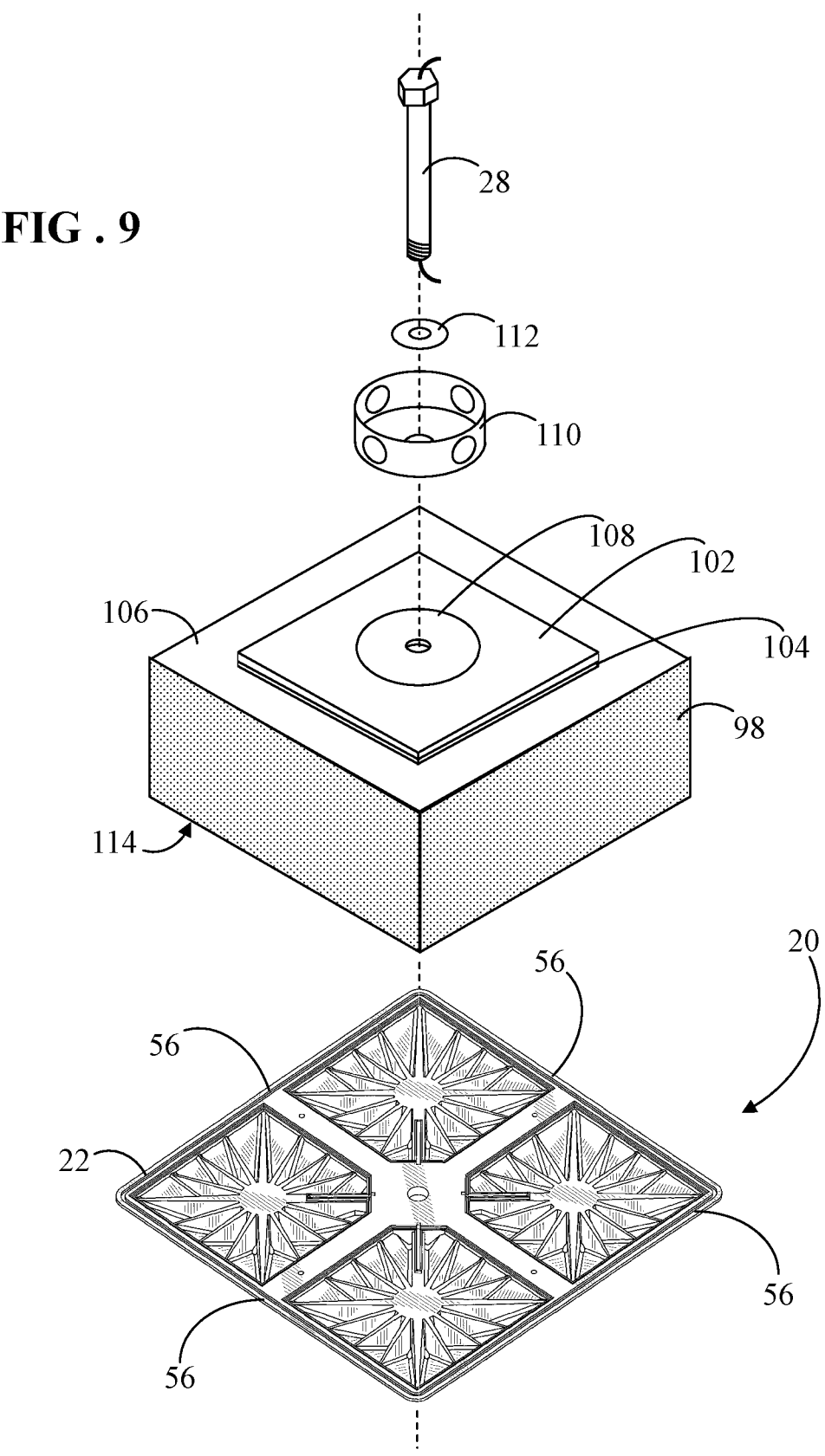
FIG. 9 shows an exploded perspective view of a mounting detail for the surface mounted light fixture of FIG. 1.
Figure 10:
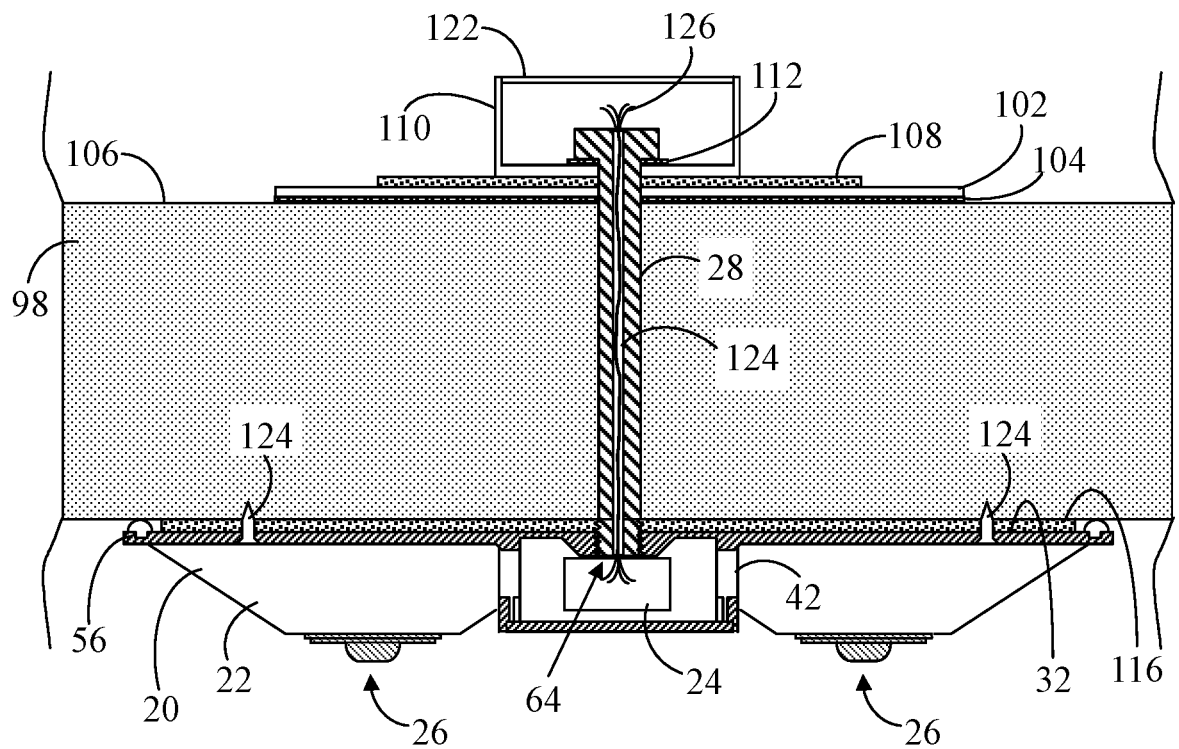
FIG. 10 shows a partial sectional side view of the mounting detail for the surface mounted light fixture.

Referring to FIGS. 9 and 10, FIG. 9 shows an exploded perspective view of a mounting detail for the surface mounted light fixture 20, and FIG. 10 shows a partial sectional side view of the mounting detail for surface mounted light fixture 20. In an embodiment, surface mounted light fixture 20 is suitable for installation in a refrigerated environment where the ambient temperature may not exceed 45° F. (7.2° C.). The refrigerated environment may be a refrigerated cooler, a walk-in refrigerated room, or the like configured to hold perishable food products. This installation environment is not a requirement however. In alternative embodiments, light fixture 20 may be installed in an environment in which the ambient temperature is greater than or less than 45° F. (7.2° C.).

A refrigerated cooler or walk-in refrigerated room may occasionally be subjected to cleaning by, for example, pressure washing. Thus, such an environment light fixture 20 can be subjected to significant moisture from cleaning operations. Accordingly, light fixture 20 employs several moisture protection strategies that will be discussed in connection with its installation.

Light fixture 20 is installed on a ceiling panel 98, such as the ceiling of an insulated cooler box or a dropped ceiling of a refrigerated room. The term "dropped ceiling" refers to a secondary ceiling hung below the main (structural) ceiling, and the area above the dropped ceiling, i.e., ceiling panel 98, is referred to as a plenum space 100.

Installation entails drilling a hole through ceiling panel 98 that is compatible with the diameter of bolt 28. A gasketed plate 102 is placed directly over the hole. In an embodiment, plate 102 may have a gasket 104 laminated to an underside of plate 102. Thus, once installed, gasket 104 would reside between plate 102 and a top surface 106 of ceiling panel 98. Gasketed plate 102 may further include another gasket 108 placed on and/or adhered to a top side of plate 102. Next, a conventional junction box 110 is placed on top of gasket 108. A neoprene washer 112 can be inserted onto bolt 28. Bolt 28 is inserted through junction box 110, through plate 102, and through ceiling panel 98.

Light fixture 20 is placed against a bottom surface 114 of ceiling panel 98 with a gasket 116 (visible in FIG. 10) interposed between ceiling panel and second side 32 of light fixture 20. Bolt 28 is rotated until some resistance is felt. That is, bolt 28 is rotated into threaded engagement with threaded opening 64 extending through junction box 42 of light fixture 20.

Referring briefly to FIG. 3, heat dissipating structure 22 may include four holes 118 extending through structure 22. Now with reference back to FIGS. 9 and 10, installation continues by fastening four sheet metal alignment screws 120 (two visible in FIG. 10) into ceiling panel 98 via holes 118 after aligning light fixture 20 in its final position. Bolt 28 and alignment screws 120 are fully tightened. After bolt 28 is fully tightened, a cover 122 may be coupled to junction box 110 to seal junction box 110 from moisture.

It should be noted that alignment screws 120 are relatively short so that they do not extend fully through ceiling panel 98. Accordingly, only a single hole is made through ceiling panel 98, thereby creating only one breach in ceiling panel 98 per light fixture 20. As bolt 28 is tightened, compression stress is applied to the X-brace configuration of fins 70 (FIG. 8). This compression stress transfers to fins 70 which act as tributaries for the compression stress. In this manner, the applied pressure is uniformly distributed around flanged outer frame 56 of heat dissipating structure 22, i.e., the perimeter of light fixture 20 (FIG. 1), resulting in a tight seal.

In an embodiment, bolt 28 may be fabricated from a thermally non-conductive material, such as a composite of plastic or graphite, or bolt 28 may be fabricated from a non-corrosive metal that is coated with a thermally non-conductive material. Bolt 28 includes a longitudinally aligned interior passage 124 for directing wiring 126 from an external power source (not shown) to electronics assembly 24 housed in junction box 42. Wiring 126 may include power and control wires for light sources 40 (FIG. 1) and any other electronics, such as occupancy sensor 46 (FIG. 1). Wiring 126 is sealed in passage 124 and is thus sealed from air and moisture travel. In the absence of moist air (or liquid) penetrating from above ceiling panel 98, and by utilizing a thermally non-conductive bolt 28, "sweating," i.e., condensation build-up, cannot occur.

Figure 11:
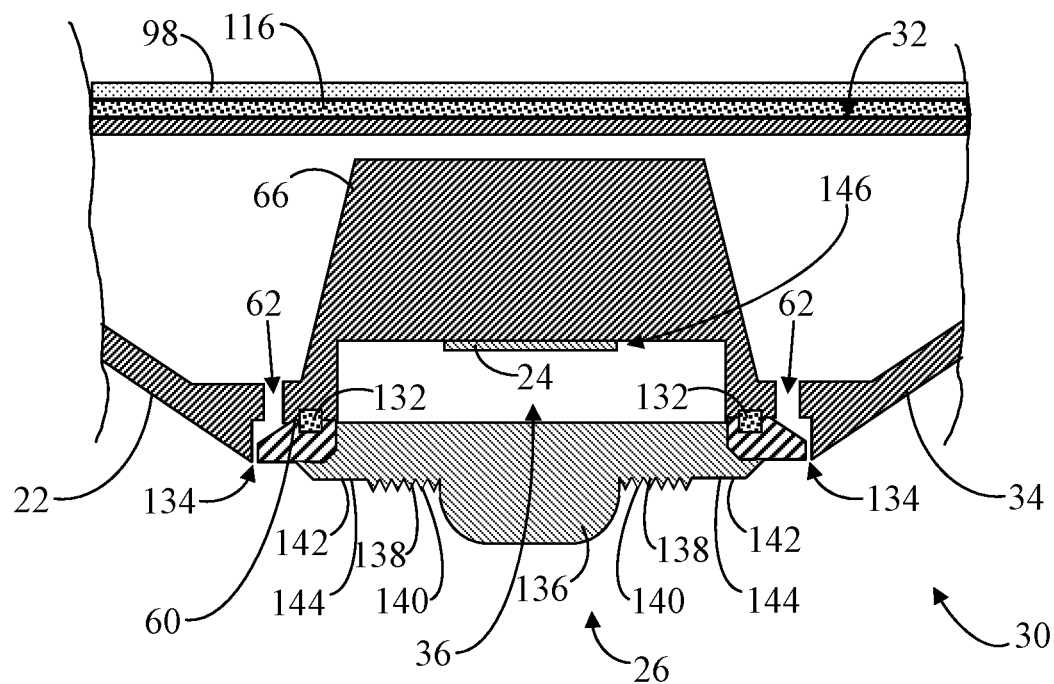
FIG. 11 shows a partial side view of a lens assembly for the surface mounted light fixture.

FIG. 11 shows a partial side view of one of lens assemblies 26 for surface mounted light fixture 20. Inside of the refrigerated space, gasket 116 protects against water entering the backside, i.e., second side 32, of heat dissipating structure 22 if and/or when light fixture 20 is cleaned by, for example, pressure washing. However, in the event that water does penetrate around gasket 116, apertures 62 in planar surface 60 of projection regions 34 located around sockets 36 function as weep holes thus allowing the water to drain by gravity flow.

Lens assembly 26 includes a lens 128 coupled to a surrounding lens frame 130. Installation of lens assembly 26 to heat dissipating structure 22 overlying socket 36 entails placement of a gasket 132 interposed between lens frame 130 and planar surface 60 of projection region 34 surrounding socket 36. Lens frame 130 may then be attached to heat dissipating structure 22 by, for example, non-corrosive screws (not shown). Lens assembly 26 with the intervening gasket 132 effectively seals socket 36 from water. Additionally, lens frame 130 extends partially over apertures 62 so that apertures 62 are not exposed to a direct spray of water. However, a remaining channel 134 around lens frame 130 still allows for the drainage of water from apertures 62.

Lens 128 may be a simple glass and/or plastic material flat lens. Alternatively, lens 128 may be a specialized lens having the capability of refracting light above a horizon line in order to avoid a "cave effect" lighting scenario. The optics of lens 128 may be variably constructed in order to achieve a particular lighting pattern. In an embodiment, a variable construct of lens 128 may include a generally hemispherical portion 136 surrounded by a series of concentric rings 138 with substantially identical, sharply peaked, symmetrical cross sections 140. Concentric rings 138 are, in turn, surrounded by an outer concentric ring 142 with a substantially flat surface 144.

Although each feature of construction of lens 128 contributes to the light output over most output angles, each feature is used primarily to control the light output over a narrow range. For example, hemispherical portion 136 primarily contributes light output in a range from normal (zero degrees) to about forty degrees. Concentric rings 138 primarily contribute light output in a range from approximately forty degrees to approximately ninety degrees, and outer ring 142 with flat surface 144 primarily contributes light output in a range from approximately ninety degrees to one hundred and twenty degrees.

A magnitude of the effect of each type of construction of lens 128 can be controlled by the relative surface area taken up by that construction. An optimization process may be used to achieve the overall desired angular output. In an optimization process, for example, primary variables can be the relative areas of each type of construction (i.e., hemispherical portion 136, peaked concentric rings 138, and outer ring 142 with flat surface 144), and/or the apex (included) angle for series of sharply peaked rings 138. The construction of lens 128 can enable the refraction of light above a horizon line, i.e., greater than ninety degrees, in order to avoid a "cave effect" lighting scenario. However, those skilled in the art will recognize that lens 128 may have alternative construction configurations then that which was disclosed.

In operation, light sources 40 generate heat when illuminated. Heat generally travels from hot to cooler regions. By virtue of their placement in sockets 36 of heat dissipating structure 22, light sources 40 are sunk into a thermal mass, i.e. heat sink 66. Heat generated by light sources 40 travels by conduction through the starburst configuration of fins 70 (FIG. 5). Fins 70 convey the heat to the outer skin of projection regions 34, i.e., to first side 30 of heat dissipating structure 22. Thus, fins 70 can efficiently remove heat from a junction 146 between light sources 40 and heat sink 66 to first side 30 of heat dissipating structure 22. An additional contributor to lowering the temperature at junction 146 is ceiling panel 98 onto which light fixture 20 is mounted. Heat trapped between fins 70 and ceiling panel 98 may be absorbed by the thermally conductive skin or surface of ceiling panel 98, and is conducted into the cooled environment.

Figure 12:
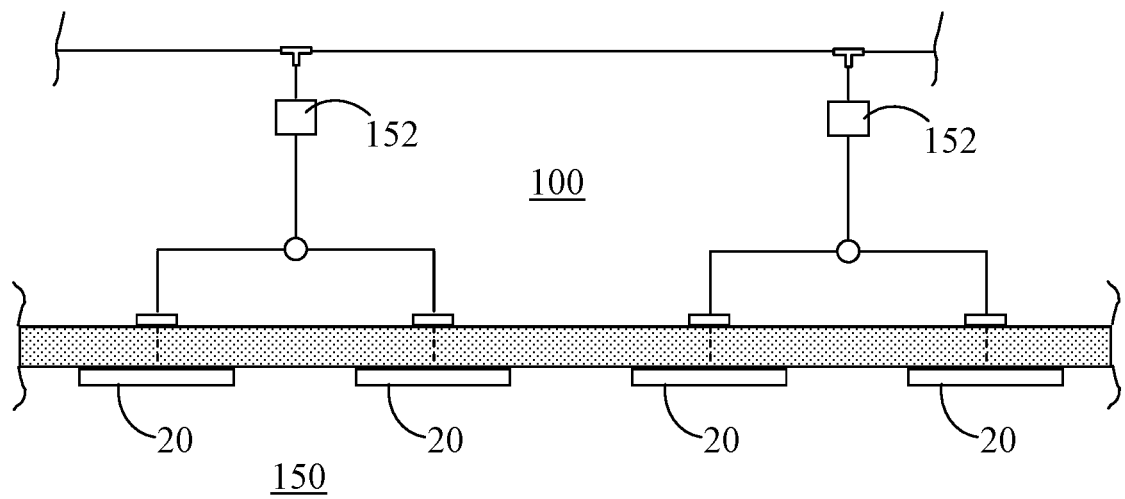
FIG. 12 shows a block diagram of a wiring configuration for multiple surface mounted light fixtures.

FIG. 12 shows a block diagram of a wiring configuration 148 for multiple surface mounted light fixtures 20. In some configurations, there may be a need for multiple light fixtures 20 in order to sufficiently light a refrigerated environment 150. In the illustrated wiring configuration 148, a separate power supply 152 is electrically connected with two light fixtures 20. Power supplies 152 are placed outside of and above refrigerated environment 150 in plenum space 100. Light fixtures 20 are electrically connected to power supplies 152 via wiring that is also located outside of and above refrigerated environment 150 in plenum space 100.

Thus, power supplies 152 are external to light fixtures 20 so that any heat produced by power supplies 152 does not compromise the lifespan of light sources 40 (FIG. 1). Additionally, power supplies 152 are external to refrigerated environment 150 so that any heat produced by power supplies 152 is not conducted through light fixture 20 and into refrigerated environment 150. Power supplies 152 may supply power to light sources 40, occupancy sensor(s) 46 (FIG. 1), photocell(s), and other devices that may be used in refrigerated environment 150. Power supplies 152 may be in communication with local or remote controls, and may operate by line voltage, low voltage, or a combination thereof. A backup power supply (not shown), such as a battery, may be used to operate light fixtures 20 where emergency illumination is required.

Figure 13:
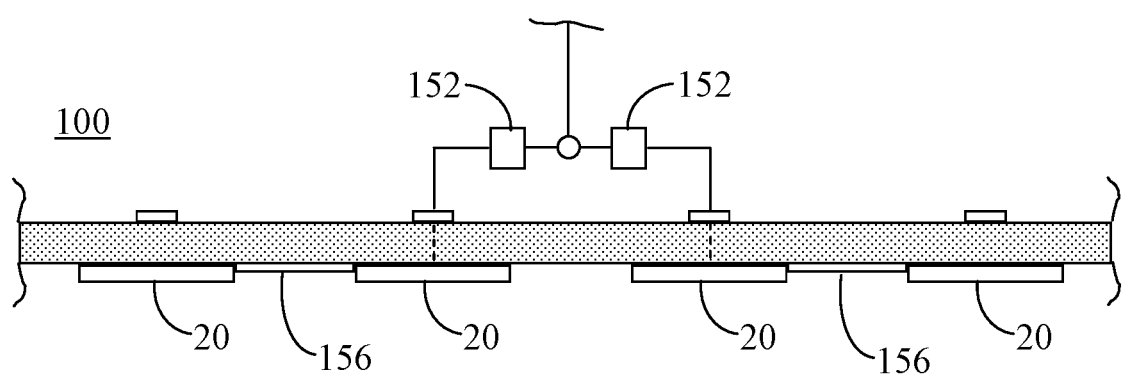
FIG. 13 shows a block diagram of another wiring configuration for multiple surface mounted light fixtures.

FIG. 13 shows a block diagram of another wiring configuration 154 for a system of surface mounted light fixtures 20. In the illustrated wiring configuration 154, a separate power supply 152 is electrically connected with two light fixtures 20. Like wiring configuration 148 (FIG. 12), power supplies 152 are placed outside of and above refrigerated environment 150 in plenum space 100 so that any heat produced by power supplies 152 does not adversely affect the lifespan of light sources 40 and/or so that any heat produced by power supplies 152 is not conducted into refrigerated environment 150. However, pairs of light fixtures 20 are electrically connected to one another in a serial arrangement via a wiring conduit 156. Thus, only one of light fixtures 20 from each pair of light fixtures 20 is directly connected to one of power supplies 152.

As discussed previously in connection with FIG. 2, in some embodiments, junction box 42 (FIG. 2) may include openings 47 (see FIGS. 2-3) extending through one or more of its side walls. These openings 47 can be utilized to direct wiring and moisture resistant conduit, referred to herein as wiring conduit 156, between junction boxes 42 of adjacent light fixtures 20. For example, one end of a wiring conduit 156 may be coupled at an opening 47 (shown in FIGS. 2-3) in junction box 42 of one of light fixtures 20, and an opposing end of wiring conduit 156 may be coupled at another opening 47 in another junction box 42 in an adjacent light fixtures 20. Any unused openings 47 in junction box 42 may be sealed using, for example, plugs (not shown) in order to maintain the moisture resistance of light fixtures 20. As such, electrical interconnection is provided between electronic assemblies (FIG. 1) of light fixtures 20 via wiring conduit 156 located inside of refrigerated environment 150. Although two wiring configurations 148 (FIG. 12) and 154 are shown, those skilled in the art will recognize that that a system of multiple light fixtures 20 sufficient to light refrigerated environment 150 can be coupled with an external power source in a multitude of configurations.

In summary, embodiments entail a surface mounted light fixture and a heat dissipating structure for the light fixture. The heat dissipating structure includes projection regions surrounding a centrally located junction box. A socket is formed at an apex of each projection region, and each socket is configured to receive an LED light source. The junction box provides a housing for power and control to the multiple light sources and additional electrical components, such as an occupancy sensor. In addition, openings in the junction box allow for the provision power and control within an environment to other light fixtures in a system configuration. A heat sink is formed in an internal cavity of each projection region. The heat sink includes fins arranged in a starburst pattern around each of the sockets so as to form an X-brace configuration. The combination of the X-brace configuration of fins and the junction box yields a rigid, low profile light fixture, capable of uniform and efficient heat extraction and dissipation. Additionally, the X-brace configuration, junction box, inclusion of gaskets, and mounting methodology produces a tight and uniform seal to a ceiling panel, with a single hole extending through the ceiling panel, so as to largely prevent water entry into the light fixture. Furthermore, the isolated and protected power wire way system through an internal passage in the bolt and into the junction box, as well as the channels extending between the junction box and each socket, provides effective routing for electrical power from an external power source to the light sources and further protects critical electrical components from moisture. A rigid, moisture resistant, low profile structure capable of effectively conducting heat away from the LED light source yields improvements in lamp energy efficiency, enhanced lifespan for the LED light sources, and can be readily implemented in commercial venues, such as refrigerated coolers, clean rooms, hazardous environments, and so forth.

Although the preferred embodiments of the invention have been illustrated and described in detail, it will be readily apparent to those skilled in the art that various modifications may be made therein without departing from the spirit of the invention or from the scope of the appended claims. For example, the design of light fixture may be scaled up or down to accommodate different light source outputs.

What is claimed is:

1. A device comprising:
 a light fixture including:
   a heat dissipating structure having a first side and a second side opposing said first side, said first side including at least one projection region extending outwardly forming an apex and a recessed surface formed in said apex, said recessed surface configured to retain a light source and located between said apex and said second side, and a plurality of fins adjacent and substantially perpendicular to said recessed surface, wherein:
   the fins extend from a position in proximity of said apex of said projection region past the recessed surface toward the second side and outwardly toward the device perimeter;
   the light source substantially directs light opposite the second side;
   said recessed light source is enclosed by a lens adjacent to an electronic device enclosure that retains at least one internal and/or external electronic device, wherein the height of the electronic device retained in said enclosure can extend beyond the adjacent light source retaining surface toward the said formed apex; and
   at least one opening at the second side of the device is configured to mechanically suspend or fasten the device to structure or configured to electromechanically suspend or fasten the device from/to structure and convey power to the device.

2. The device of claim 1, further comprising a device externally coupled to a removable access panel of the electronic device enclosure, wherein the device can sense, communicate or sense and communicate.

3. The device of claim 1, wherein the electronic device enclosure is coupled to or monolithically formed with the heat dissipating structure and the electronic device enclosure is made of heat conducting and dissipating material.

4. The device of claim 1, wherein the heat dissipating device power ingress is from one side.

5. The device of claim 1, wherein a device employs a plurality of light source retaining recessed surfaces.

6. The device of claim 1, wherein the lamp lens with the electronic device enclosure is/are sealed to moisture ingress.

7. A device comprising:
 a light fixture including:
   a heat dissipating structure having a first side and a second side opposing said first side, said first side including at least one projection region extending outwardly forming an apex and a recessed surface formed in said apex, said recessed surface retaining a light source and located between said apex and the second side, and a plurality of fins adjacent and substantially perpendicularly to said recessed surface, wherein:
   the fins extend from a position in proximity of said apex of said projection region past the recessed surface toward the second side and outwardly toward the device perimeter;
   the recessed light source substantially directs light in a direction opposite to the second side; the recessed light source is enclosed by a lens adjacent to an electronic device enclosure and,
   the heat generated by the light source and absorbed by the heat sink travels by conduction laterally to the monolithically coupled heat dissipating fins.

8. The device of claim 7, wherein a device externally coupled to a removable access panel of the electronic device enclosure can sense, communicate or sense and communicate.

9. The device of claim 7, wherein the electronic device enclosure is coupled to or monolithically formed with the heat dissipating structure and the electronic device enclosure is made of heat conducting and dissipating material.

10. The device of claim 7, wherein the heat dissipating device power ingress is at the device's second side or from one side.

11. The device of claim 7, wherein a device employs a plurality of light source retaining recessed surface.

12. The device of claim 7, wherein the lamp lens with the electronic device enclosure is/are sealed to moisture ingress.

13. A device comprising:
   a light fixture including:
      a heat dissipating structure having a first side and a second side opposing said first side, said first side including at least one projection region extending outwardly forming an apex and a recessed surface formed in said apex, said recessed surface retaining a light source and located between said apex and the second side, and a plurality of fins adjacent and substantially perpendicularly to said recessed surface, wherein:
      the fins extend from a position in proximity of said apex of said projection region past the recessed surface toward the second side and outwardly toward the device perimeter;
      the light source substantially directs light in a direction opposite to the second side; said recessed light source is enclosed by a lens adjacent to an electronic device enclosure that can retain at least one internal and/or external electronic device, wherein: the height of the electronic device retained in said enclosure can extend beyond the adjacent light source retaining surface toward the said formed apex and,
      at least one through opening between the first side and the second side of the light emitting device is configured to provide mechanical mean of support for suspending or fastening device from/to structure.

14. The light fixture of claim 13, wherein a device externally coupled to a removable access panel of the electronic device enclosure can sense, communicate or sense and communicate.

15. The device of claim 13, where in the electronic assembly enclosure is coupled to or monolithically formed with the heat dissipating structure and the electronic device enclosure is made of heat conducting and dissipating material.

16. The device of claim 13, wherein the heat dissipating device power ingress is either from the second side or from the side.

17. The device of claim 13, wherein a device employs a plurality of light source retaining recessed surface.

18. The device of claim 13, wherein the lamp lens with the electronic device enclosure is/are sealed to moisture ingress.

* * * * *